(12) United States Patent
Naughton

(10) Patent No.: US 6,276,585 B1
(45) Date of Patent: Aug. 21, 2001

(54) APPARATUS FOR SEPARATING PRE-SCRIBED SHAPES FROM A GLASS SHEET

(75) Inventor: Michael F. Naughton, Athlone (IE)

(73) Assignee: Donnelly Mirrors Limited (IE)

( * ) Notice: Subject to any disclaimer, the term of this patent is extended or adjusted under 35 U.S.C. 154(b) by 0 days.

(21) Appl. No.: 09/348,849

(22) Filed: Jul. 7, 1999

(30) Foreign Application Priority Data

Jul. 7, 1998 (IE) ......................................... 980545

(51) Int. Cl.$^7$ ..................................................... B26F 3/00
(52) U.S. Cl. ........................... 225/96.5; 225/94; 225/97; 225/103
(58) Field of Search .......................... 225/96.5, 93, 103, 225/104, 105, 97

(56) References Cited

U.S. PATENT DOCUMENTS

| | | | |
|---|---|---|---|
| 3,907,185 | * 9/1975 | Suzuki | 225/97 |
| 3,913,812 | * 10/1975 | Augustin et al. | 225/96.5 |
| 3,917,139 | * 11/1975 | Kabanov et al. | 225/96.5 |
| 4,004,723 | 1/1977 | Kabanov et al. | 225/103 |
| 4,151,940 | * 5/1979 | Nuding et al. | 225/96.5 |
| 4,227,635 | * 10/1980 | Delettre | 225/96.5 |
| 4,371,103 | * 2/1983 | Siemens et al. | 225/97 |
| 4,454,972 | * 6/1984 | Maltby, Jr. et al. | 225/96.5 |
| 4,489,870 | * 12/1984 | Prange et al. | 225/96.5 |
| 5,810,642 | * 9/1998 | Bando | 225/96.5 |
| 5,857,603 | * 1/1999 | Lisec | 225/96.5 |

FOREIGN PATENT DOCUMENTS

| | | |
|---|---|---|
| 295 12 519 U1 | * 11/1995 | (DE) . |
| 0503647A2 | 9/1992 | (EP) . |
| 0503647A3 | 9/1992 | (EP) . |
| 2252303 | 6/1975 | (FR) . |
| 2268762 | 11/1975 | (FR) . |

* cited by examiner

Primary Examiner—M. Rachuba
(74) Attorney, Agent, or Firm—VanDyke, Gardner, Linn & Burkhart, LLP

(57) ABSTRACT

An apparatus for separating pre-scribed glass shapes 10 from a glass sheet 12 includes a conveyor 22 for transporting the glass sheet parallel to its edges 14 with the margins 18 of the sheet accessible from both sides of the sheet. A pair of glass-cracking devices 24 are located substantially directly opposite one another on opposite sides of the conveyor respectively. Each glass-cracking devices 24 is arranged to bear repetitively on opposite sides of the respective margin 18 as the sheet is conveyed past thereby to break the sheet progressively along its margins to cause the glass sheet to fracture along scribe lines 16 defining the glass shapes. Each glass-cracking devices may comprise a pair of jaws which open and close on the respective margin or a pair of toothed wheels between which the margin passes.

13 Claims, 4 Drawing Sheets

APPARATUS FOR SEPARATING PRE-SCRIBED SHAPES FROM A GLASS SHEET

This invention relates to an apparatus for separating a plurality of pre-scribed shapes from a glass sheet.

In the manufacture of, for example, rearview mirrors for vehicles, a number of mirror shapes are scribed in a sheet of glass. However, the glass sheet still has a great deal of integrity and the shapes do not simply fall out if the sheet is lifted. Current practice is therefore to break the prescribed mirror shapes out of the glass sheet by hand.

It is an object of the invention to provide an apparatus in which this process is automated.

According to the present invention there is provided an apparatus for separating a plurality of pre-scribed shapes from a glass sheet, the glass sheet having opposite parallel edges and a margin along each edge of the sheet free of the pre-scribed shapes, the apparatus comprising means for automatically breaking the glass sheet progressively along each margin to cause the glass sheet to fracture along scribe lines defining the pre-scribed shapes.

Preferably the apparatus includes a conveyor for transporting the glass sheet in a given direction parallel to its edges with the margins accessible from both sides of the sheet, and a pair of glass-cracking means located substantially directly opposite one another on opposite sides of the conveyor respectively and each arranged to bear repetitively on opposite sides of a respective margin as the sheet is conveyed therepast.

In a first embodiment of the invention each glass-cracking means comprises a pair of jaws which open and close on the respective margin as the sheet is conveyed.

In a second embodiment of the invention each glass-cracking means comprises a pair of toothed wheels between which the margin passes as the sheet is conveyed.

Embodiments of the invention will now be described, by way of example, with reference to the accompanying drawings in which.

Figure 1:
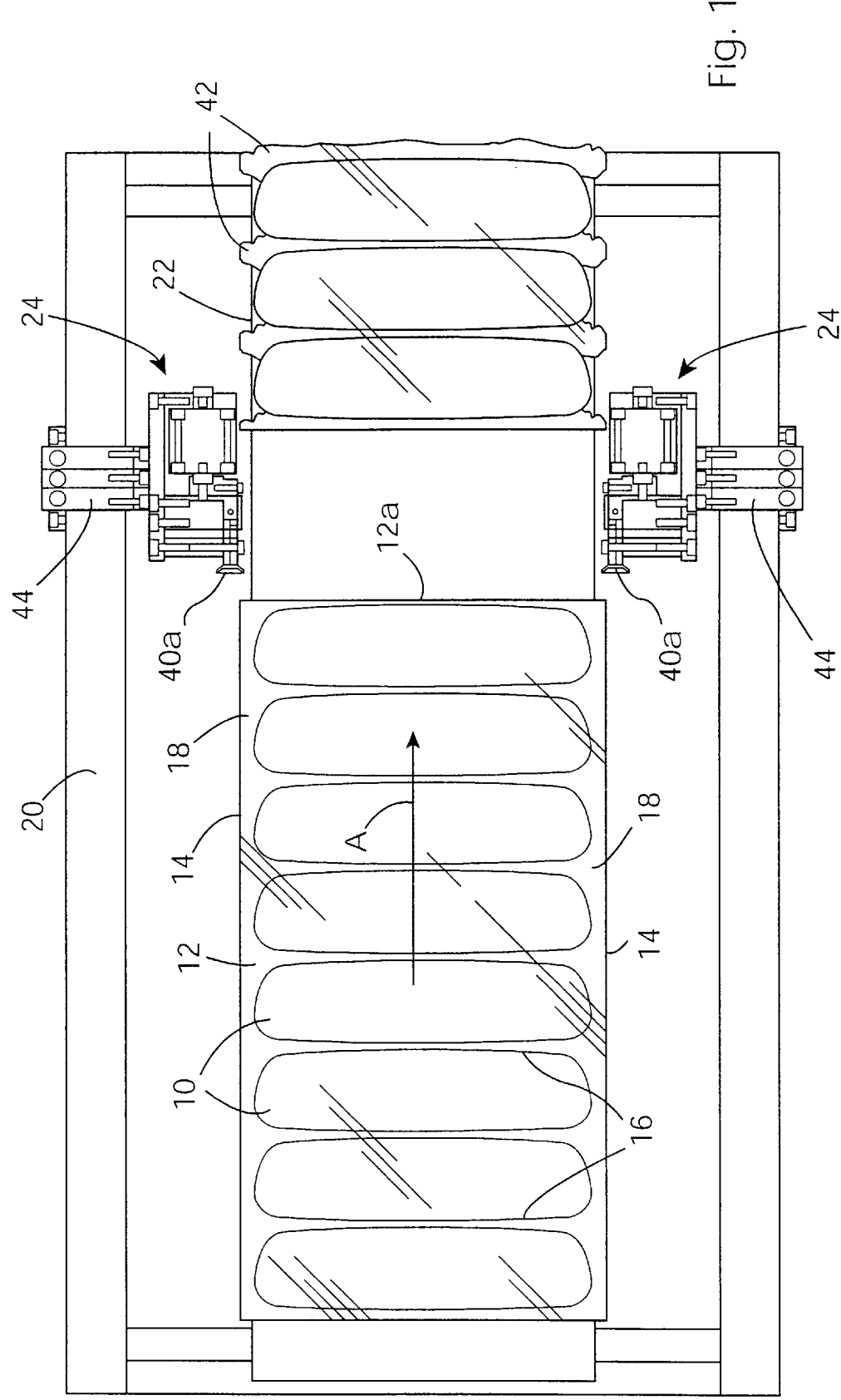
FIG. 1 is a plan view of a first embodiment of an apparatus according to the invention.
Figure 2:
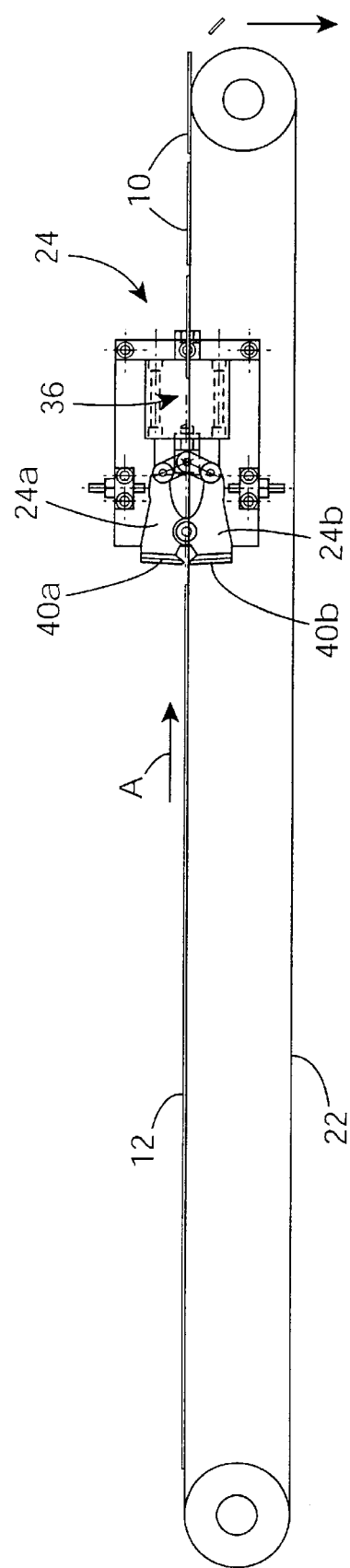
FIG. 2 is a side view of the apparatus of FIG. 1.
Figure 3:
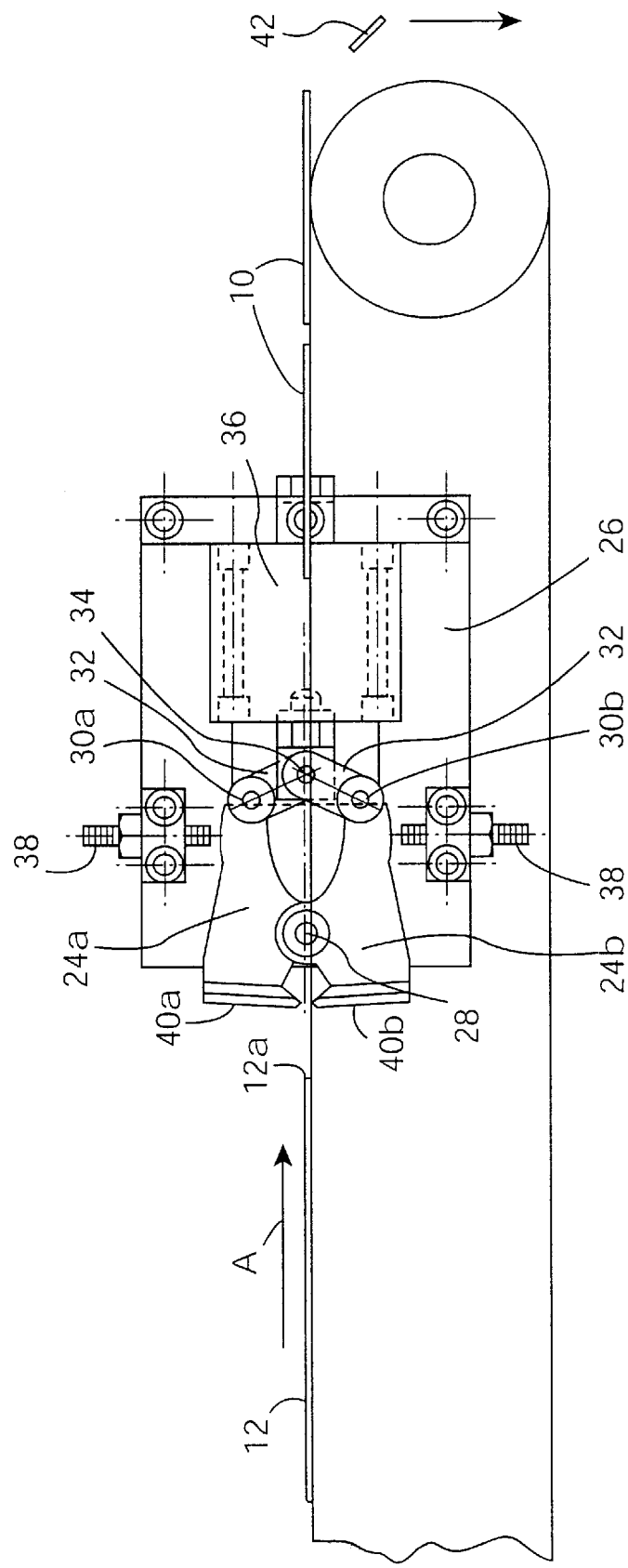
FIG. 3 is an enlarged side view of the jaws used in the apparatus of FIG. 1.

FIGS. 1 to 3 show a first embodiment of apparatus for separating a plurality of pre-scribed glass shapes 10 from a rectangular glass sheet 12 having opposite parallel edges 14. The glass shapes 10, which are defined by scribe lines 16 on the glass, are elongated across the width of the sheet 12, i.e. in a direction perpendicular to the edges 14, and are arranged side-by-side along the length of the sheet. However, there is a narrow margin 18 along each edge 14 of the sheet which is free of the glass shapes 10. The apparatus includes a frame 20 (not shown in FIG. 2) on which are mounted a vacuum conveyor belt 22 and a pair of breakout jaws 24. The breakout jaws 24 are located directly opposite one another on opposite sides of the conveyor 22 respectively.

Each pair of breakout jaws 24 includes upper and lower jaw members 24a, 24b respectively, FIG. 3, pivotally mounted in a frame 26 for rotation about an axis 28 fixed relative to the frame. Each jaw member 24a, 24b has a hardened steel tooth 40a or 40b at its free front end. The rear end of each jaw member 24a, 24b is individually pivoted at point 30a or 30b to one end of a respective short link 32, the other ends of the links 32 being pivoted together at a common point 34 to a pneumatic actuator 36. In use, the actuator 36 is driven to effect reciprocation of the point 34 to and fro in a horizontal direction (as seen in FIG. 3) which will in turn, via the links 32, cause the jaw members 24a, 24b to open and close. Manually adjustable screws 38 mounted in the frame 26 respectively above and below the rear ends of the jaw members 24a, 24b act as stops to allow an operator to set the maximum extent of closure of the jaws.

In use of the apparatus, both pairs of breakout jaws 24 are initially held open and the leading edge 12a of the glass sheet 12 is fed by the conveyor 22, in the direction of the arrow A in FIG. 1, centrally between the jaws 24 such that each edge 14 of the sheet passes between the steel teeth 40a, 40b of the respective jaw members 24a, 24b on the corresponding side of the conveyor with the teeth 40a, 40b overlapping a short distance onto the margins 18. To allow this to happen the width of the conveyor 22 is less than the width of the glass sheet 12, so that the latter overhangs the conveyor at each side to allow access to the margins 18 from both sides of the sheet.

Once the leading edge 12a is between the pairs of breakout jaws 24 each actuator 36 is driven by pneumatic control means (not shown) to effect a rapid reciprocation of the respective point 34, and hence a rapid opening and closing of the associated jaw members 24a, 24b onto the glass, while at the same time the conveyor 22 is driven to feed the glass sheet 12 slowly past the jaws in the direction of the arrow A. The effect of the rapidly opening and closing jaws is to break away small amounts of glass progressively along each margin 18 and also provide the glass with sufficient shock to cause the glass sheet to fracture along the scribe lines 16 defining the glass shapes 10. The two pairs of jaws 24 on each side of the sheet are preferably operated in synchronism such that they open and close at the same time.

As the sheet 16 passes beyond the breakout jaws 24 the glass shapes 10 are lifted from the conveyor 22, either by hand or automatically by suction cups (not shown), while the waste cullets 42 are allowed to drop off the end of the conveyor into a bin.

Typically, glass sheets which are to handled by the above apparatus range from 560–1220 mm in length by 215–300 mm in width, and with a thickness ranging from 1.0–2.4 mm. The width of the conveyor 22 must therefore be narrow enough to accommodate the narrowest glass sheet with its edges overhanging the sides of the conveyor, and it must be long enough to adequately support the longest glass sheet prior to its being fed between the jaws 24.

Further, in order to accommodate different widths of glass sheet, the breakout jaws 24 are fitted with linear scales 44 so that the position of each jaws 24 may be adjusted laterally in a direction towards or away from the centreline of the conveyor 22 according to the width of glass sheet to be handled. Also, in order to ensure that the glass sheet is centered between the jaws 24, alignment guides (not shown) may be fitted on either side of the conveyor 22, these also being fitted with linear scales for adjustment laterally of the conveyor for different width glass sheets.

The maximum closure adjustment of the breakout jaws 24, as effected by the screws 38, will be selected depending upon the thickness and nature of the glass. Thus the glass can be lightly crunched, or completely broken through. Typically, each jaw member 24a, 24b will have a stroke of about 5 mm. Also, the rate at which the conveyor 22 feeds the glass sheet past the jaws, and the rate of opening and closing the jaws by the pneumatic control means, may also be adjusted according to the nature and thickness of the glass. The conveyor 22 may feed the glass sheet continuously or intermittently past the breakout jaws 24.

Although the foregoing has described each pair of breakout jaws 24 driven by its own actuator, they could be coupled together and driven by a common actuator. This would ensure that they open and close in synchronism, which is desirable if not absolutely essential. Further, the jaws could be powered by an electric motor, hydraulic power or an electric solenoid, instead of pneumatic power as described.

Figure 4:
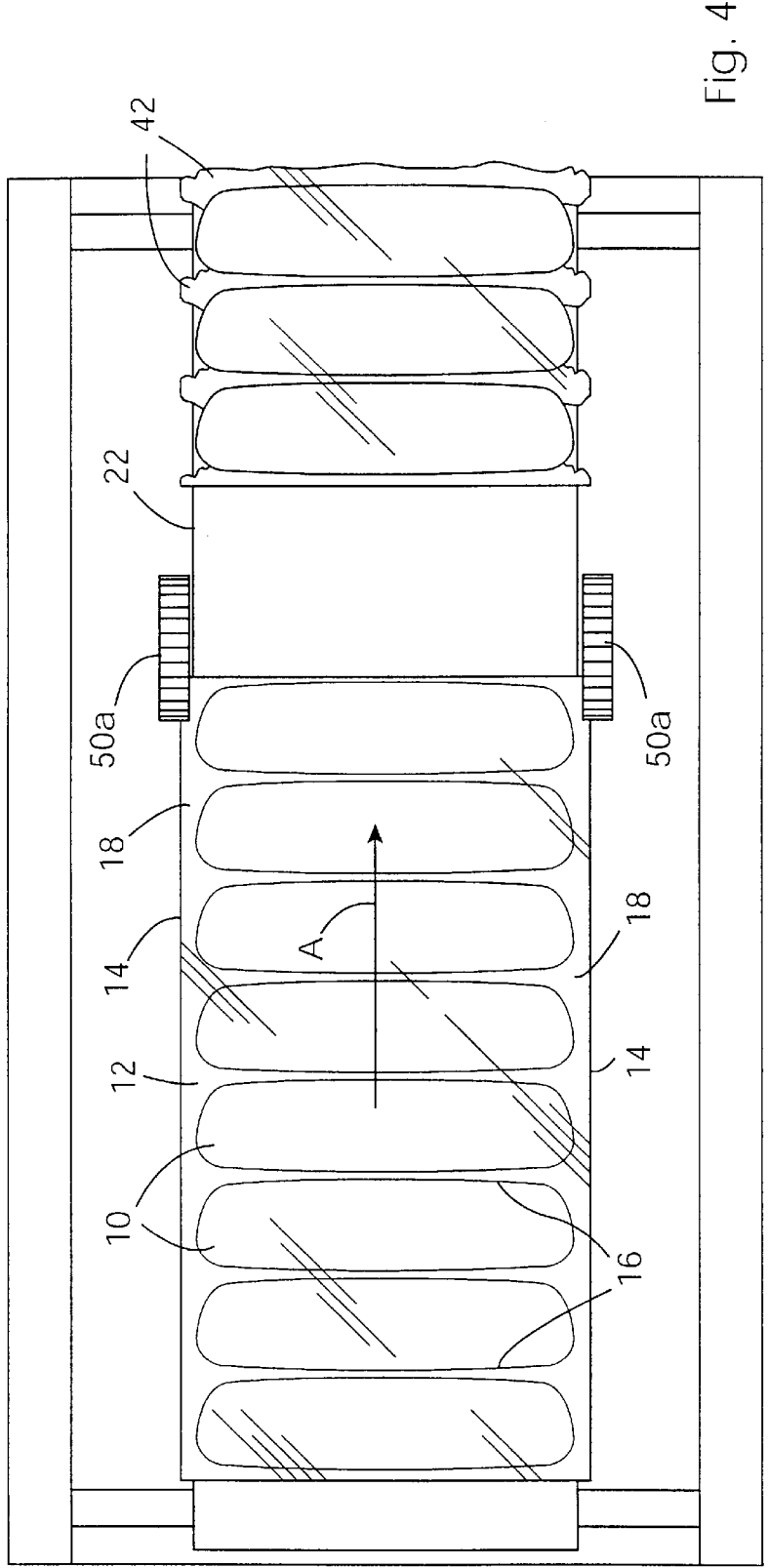
FIG. 4 is a plan view of a second embodiment of an apparatus according to the invention.
Figure 5:
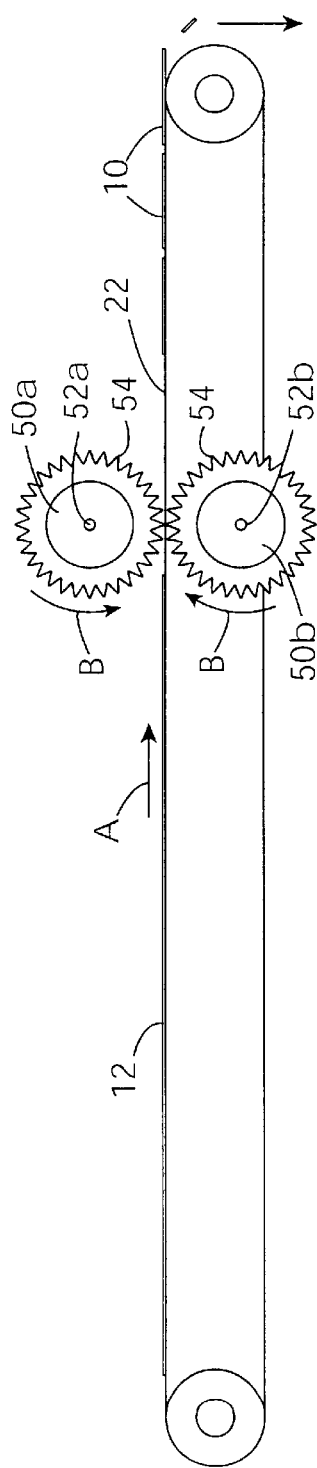
FIG. 5 is a side view of the apparatus of FIG. 4.

In a second embodiment of the invention, FIGS. 4 and 5, each pair of upper and lower jaw members 24a, 24b is replaced by a respective pair of upper and lower toothed wheels 50a, 50b respectively each rotatable about a horizontal axis 52a or 52b. The toothed periphery of each wheel 50a, 50b overlaps the respective edge 14 of the glass sheet so as to extend a short distance onto the margins 18, and the edges of the sheet 12 pass between the wheels as the sheet is fed past them by the conveyor 22.

In use the wheels 50a, 50b are driven, by means not shown, in the directions shown by the arrows B in FIG. 5 in synchronism with the movement of the sheet 12, so that along each margin 18 successive pairs of the pointed teeth 54, one on each wheel 50a, 50b, are brought to bear simultaneously on opposite sides of the margin 18 to crunch or break the glass between them. Again, the result is that small amounts of glass are progressively broken away along each margin 18 and the glass sheet is fractured along the scribe lines 16 defining the glass shapes 10. The vertical separation of the rotational axes 52a, 52b of the toothed wheels is adjustable to allow for different thicknesses of glass sheet and, like the pairs of jaws 24, the pairs of wheels 50a, 50b are adjustable laterally in a direction towards or away from the centreline of the conveyor 22 according to the width of glass sheet to be handled.

The invention is not limited to the embodiments described herein which may be modified or varied without departing from the scope of the invention.

What is claimed is:

1. An apparatus for separating a plurality of pre-scribed shapes from a glass sheet, the glass sheet having opposite parallel edges and a margin along each edge of the sheet free of the pre-scribed shapes, the apparatus comprising means for engaging the glass sheet at at least one margin and automatically breaking the glass sheet progressively along said at least one margin to cause the glass sheet to fracture along scribe lines defining the pre-scribed shapes.

2. An apparatus as claimed in claim 1, wherein the apparatus includes a conveyor for transporting the glass sheet in a given direction parallel to its edges with the margins accessible from both sides of the sheet, and a pair of glass-cracking means located substantially directly opposite one another on opposite sides of the conveyor, each of said pair of glass-cracking means being arranged at a respective side of the conveyor and being operable to bear repetitively on opposite surfaces of a respective margin as the sheet is conveyed therepast.

3. An apparatus as claimed in claim 2, wherein each glass-cracking means includes means for bringing at least one pair of teeth to bear repetitively and simultaneously on opposite surfaces of the respective margin.

4. An apparatus as claimed in claim 3, wherein the teeth are provided on a pair of jaws, the glass cracking means including actuator means for causing the teeth to open and close on the respective margin as the sheet is conveyed.

5. An apparatus as claimed in claim 4, further including means to adjust the maximum extent to which the jaws may close to accommodate different thicknesses of glass sheet.

6. An apparatus as claimed in claim 3, wherein each glass-cracking means comprises a pair of toothed wheels between which the margin passes as the sheet is conveyed, the wheels being driven in synchronism with the movement of the sheet so that successive pairs of teeth, one on each wheel, are brought to bear simultaneously on opposite sides of the margin.

7. An apparatus as claimed in claim 6, further including means to adjust the separation of the rotational axes of the wheels to accommodate different thicknesses of glass sheet.

8. An apparatus as claimed in claim 2, wherein the glass-cracking means are adjustable laterally of the conveyor to accommodate different widths of glass sheet.

9. An apparatus as claimed in claim 3, wherein the glass-cracking means are adjustable laterally of the conveyor to accommodate different widths of glass sheet.

10. An apparatus as claimed in claim 4, wherein the glass-cracking means are adjustable laterally of the conveyor to accommodate different widths of glass sheet.

11. An apparatus as claimed in claim 5, wherein the glass-cracking means are adjustable laterally of the conveyor to accommodate different widths of glass sheet.

12. An apparatus as claimed in claim 6, wherein the glass-cracking means are adjustable laterally of the conveyor to accommodate different widths of glass sheet.

13. An apparatus as claimed in claim 7, wherein the glass-cracking means are adjustable laterally of the conveyor to accommodate different widths of glass sheet.

* * * * *